United States Patent Office 3,484,414
Patented Dec. 16, 1969

3,484,414
PROCESS FOR THE CONTINUOUS POLYMERIZATION OF LACTAMS
George G. Joris, Madison, and Robert H. Miller, Morristown, N.J., assignors to Allied Chemical Corporation, New York, N.Y., a corporation of New York
No Drawing. Filed Apr. 6, 1967, Ser. No. 628,834
Int. Cl. C08g 20/18
U.S. Cl. 260—78        8 Claims

ABSTRACT OF THE DISCLOSURE

This invention relates to a continuous, high temperature process for the anionic polymerization of lactams in an extruder using dicaprolactim ether as cocatalyst promoter. Shaped profiles of high molecular weight heat stable polymer are produced rapidly in a continuous manner.

---

The anionic polymerization of lactams, particularly of caprolactam, is well-known and produces high molecular weight polyamides in a much shorter time than required by conventional hydrolytic processes. The anionic polymerization also produces polyamides having molecular weights higher than are obtainable by the hydrolytic process even after many hours of reaction time, with consequent improvement in the physical and mechanical properties of the polyamides. Polymerization of lactams in the presence of an anionic catalyst at temperatures above the melting point of the lactam but below the melting point of the resultant polyamide has been successfully employed to prepare solid castings or molded articles of polyamides having high molecular weights and low monomer content, such as those described in U.S. Patent No. 3,138,574, issued June 23, 1964. However, when it is desired to prepare continuous profiles, these polyamides are subject to the disadvantage that upon heating and melting for subsequent processing such as by extrusion and the like, the melt viscosity of the polyamide, which is a measure of molecular weight, increases rapidly, necessitating the use of equipment which can withstand very high initial pressures. As heating is continued, the melt viscosity of the polyamide reaches a peak and thereafter decreases, rapidly at first and more slowly thereafter, finally reaching an equilibrium which is temperature dependent. The melt viscosity and molecular weight of the polyamide decreases substantially during this step. As the molecular weight of the polyamide varies, the physical and mechanical properties of the polyamide vary as well, and it is very difficult to obtain products having reproducible properties except by very careful regulation of the time and temperature of polymerization and subsequent processing, particularly when high molecular weight products are required. Articles prepared from polyamide anionically polymerized below the melt and having stable and reproducible high molecular weights cannot be formed under the conditions of time and temperature normally encountered in conventional processing such as injection molding and extrusion.

Several proposals have been presented to overcome these difficulties and permit the preparation of continuous profiles of high molecular weight polyamide in a single step process by anionically polymerizing a lactam at temperatures above the melting point of the polyamide and simultaneously shaping the polyamide, e.g. by extrusion. Continuous profiles can be obtained without the need for unusual equipment; but again, upon continued heating, the melt viscosity of the polyamide decreases rapidly such that the products obtained have a large variation in molecular weight unless the time and temperature of the polymerization are very carefully controlled. In order to obtain high molecular weight polyamide as a continuous profile, the catalyzed lactam must be polymerized as rapidly as possible and extruded and cooled at or near the maximum melt viscosity reached.

The use of a cocatalyst promoter has been found useful to shorten the time required to attain maximum viscosity values. Increasing the concentration of promoter decreases the maximum melt viscosity obtained during polymerization and also reduces the relative decrease from the maximum melt viscosity which occurs on continued heating. However, promoters which are known for the anionic polymerization of lactams and which are effective at temperatures of polymerization below the polyamide melting point are not all effective at temperatures of polymerization above the polyamide melting point, and others present certain difficulties in handling and mixing. Continuous processes for the polymerization of lactams have been proposed in the prior art, but all are unsatisfactory in certain respects. British Patents 919,246, issued Feb. 20, 1963; 944,307, issued Dec. 11, 1963; and 969,989, issued Sept. 16, 1964, describe continuous anionic polymerization processes whereby the lactam is only partly polymerized in the reactor to avoid the formation of high melt viscosities followed by a post-polymerization heating step, that is, heating at a temperature above the melting point of the monomer but below the melting point of the polyamide to form an equilibrium polymer. During the post-polymerization heating step, the molecular weight of the polyamide decreases substantially from its peak value. Other processes such as those disclosed in British Patents 904,229, issued Aug. 22, 1962; and 923,137, issued Apr. 10, 1963, utilize lengthy reaction times so that polymer is extruded at less than its maximum melt viscosity and molecular weight.

Additionally, the lactam-catalyst-cocatalyst mixtures employed in the prior art cannot be prepared and stored in advance but must be admixed just prior to polymerization. Most continuous processes disclosed heretofore provide special equipment and/or feeding systems to form the polymerization mixture contemporaneously with polymerization. Cocatalysts disclosed in the prior art for high temperature anionic polymerization such as acyl derivatives of the monomer, organic peroxides, cyclic and non-cyclic anhydrides, alkyl esters of mono- and dicarboxylic acids, and acid chlorides as disclosed in British Patent 986,678, issued Mar. 17, 1965, and monoacylamino carboxylic acid esters as disclosed in British Patent 923,137, polymerize the catalyzed monomer to an unknown extent on standing at temperatures above the melting point of the monomer even for a few minutes. This can be noted by the formation of a precipitate, the formation of cloudy or colored solutions or an increase in the viscosity of the reaction mixture. Low molecular weight polymer is formed which does not increase in molecular weight upon subsequent heating to polymerization temperatures. Also the formation of this low molecular weight polymer uses up cocatalyst to an unknown extent and the final concentration of cocatalyst varies, with consequent variation of the molecular weight of the polymer obtained. Thus, the mixing of monomer, catalyst and cocatalyst in the continuous processes of the prior art is very important and must be carefully regulated by mixing separate solutions or solutions containing monomer and catalyst and monomer and cocatalyst just prior to polymerization.

It is a primary object of the present invention to provide a process for the continuous formation of high molecular weight polyamide at temperatures well above the polyamide melting point.

It is another object to provide a process whereby high molecular weight polyamide is produced which will not degrade substantially upon continued heating.

It is a further object to provide a cocatalyst promoter for the rapid polymerization of lactams at high temperatures which stabilizes the melt viscosity of the polyamide upon subsequent heating.

It is another object to provide a cocatalyst promoter for the rapid anionic polymerization of lactams which forms stable solutions with lactams in admixture with an anionic catalyst at temperatures above the melting point of the lactam.

Further objects will become apparent from the following detailed description thereof.

We have found that continuous profiles of high, comparatively stable molecular weight polyamide can be prepared by polymerizing one or more lactams in the presence of an anionic catalyst at relatively high temperatures, at least above about 260° C. in an extruder, using dicaprolactim ether as cocatalyst promoter. This cocatalyst shortens the time required for the formation of high molecular weight polyamide over that required for polymerization without a cocatalyst. The time required for the formation of maximum molecular weight polyamide decreases as the concentration of the dicaprolactim ether in the lactam solution is increased. The presence of the cocatalyst lowers the peak melt viscosity obtained over that reached in the absence of cocatalyst, and increasing the concentration of dicaprolactim ether lowers the peak melt viscosity. More importantly, we have found that this cocatalyst of from about 1:0.5 to about 1:3 directly to a suit- the usual degradative effects of prolonged heating of the polyamide.

An additional advantage of the use of this cocatalyst is that it forms solutions with monomer and catalyst at temperatures above the melting point of the monomer and below about 110° C. that are stable for prolonged periods. Thus, solutions containing the desired amount of monomer, catalyst and cocatalyst can be premixed and fed to a polymerization reactor without the need of separate storage facilities, special equipment or careful regulation and metering of solutions.

According to our process, any lactam containing from high molecular weight polyamide can be formed and shaped in a single step by feeding a mixture containing one or more lactams, an anionic catalyst and dicaprolactim ether, in a molar ratio of lactam to catalyst of from about 100:1 to about 1200:1 and a molar ratio of catalyst to cocatalyst stabilizes the melt viscosity of the polyamide to able reactor maintained at a temperature at least about 260° C. up to about 325° C. and continuously removing the polymerized mass through a suitable orifice such as a die. To form continuous profiles of high molecular weight polyamide, the use of elevated temperatures is advantageous in several respects: it promotes rapid polymerization to very high molecular weight polyamide; it lowers the melt viscosity of the polyamide and prevents overpressuring of equipment. The preferred temperature range in our process is from about 285° C. up to about 310° C. Even at temperatures of 325° C., however, endless profiles of polyamides having excellent color were obtained using dicaprolactim ether as the cocatalyst, whereas other cocatalysts known in the prior art yield discolored products at much lower temperatures.

Accordingly, the invention describes a process whereby 5 to 12 carbon atoms in the ring or a mixture of such lactams can be employed to prepare the corresponding polyamides and copolyamides. Suitable lactams include, for example, ε-caprolactam, caprylactam, caproiclactam, dodecalactam, lauryllactam and the like.

Generally, all known anionic catalysts can be employed in our process including the alkali metals such as lithium, potassium and sodium and the alkaline earth metals or the hydroxides, oxides, hydrides, alkoxides, amides, borohydrides, alkyl and aryl derivatives of these metals.

Although the reason for the excellent storability of dicaprolactim ether in admixture with catalyzed monomer solutions is not fully known, it is believed that the active promoter is N(2-caprolactam)-ε-caprolactam, which is derived from dicaprolactim ether by a tautomeric rearrangement in the presence of a base at elevated temperatures. The rearrangement is illustrated below:

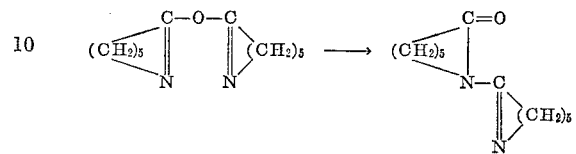

As the catalyst and cocatalyst concentration in the monomer is decreased, the molecular weight of the resultant polyamide increases, and the preferred concentration of monomer to catalyst ranges from about 600 to 1000 mols of monomer for each mol of catalyst present to prepare a high molecular weight polyamide. The preferred concentration of catalyst to cocatalyst ranges from about 1:1 to about 1:2 to prepare a thermally stable polyamide.

The time of polymerization is important and when a high molecular weight product is desired, the residence time of the polymerizing mixture in the reactor should be such that the polyamide is obtained at or near its maximum melt viscosity. We have found that increasing the concentration of dicaprolactim ether decreases the induction time needed for the formation of high molecular weight polyamide which can be obtained in from about 3 to about 12 minutes in the reactor. The optimum residence time is dependent upon the concentration of reactants. In our preferred process, as the molar concentration of monomer to catalyst varies from 600:1 to 1000:1, the residence time can vary from 4 to 6 minutes.

The temperature of polymerization preferred in our process is from about 275° C. to about 310° C. At lower temperatures the residence time must be somewhat longer than optimum with a consequent decrease from peak molecular weights of the polyamide. At higher temperatures the polyamide contains appreciable quantities of monomer which may have to be removed for some applications.

If desired, the monomer content in the polyamide can be further reduced by providing a volatilizing zone in the polymerization reactor, such as a vacuum chamber as disclosed in U.S. Patent 3,117,181, issued Apr. 6, 1965, or a circulating hot gas chamber. The low molecular weight monomer and oligomers are volatilized and the low monomer-content polyamide is then passed through a suitable orifice as before. The vacuum and gas chambers can be fitted with suitable condensers or traps for the recovery of unpolymerized material. When a vacuum chamber is employed, the high temperatures of polymerization employed in our process have an additional advantage. The temperature of the polyamide decreases somewhat as it passes through the chamber, and at low temperatures of polymerization the accompanying increase in melt viscosity can cause overpressuring of equipment or partial solidification of the polyamide can occur.

Various fillers, dyes and pigments may be added to the liquid monomer mixture before it enters the polymerization reactor. For example, fiberglass, carborundum, carbon black and titanium dioxide can be added. The screw of the extruder aids in thoroughly dispersing these materials in the polymerizing mass.

Further, when low molecular weight polyamides are desired, an amide-splitting agent such as an acid can be added after polymerization has occurred but prior to extrusion from the reactor. These agents have the effect of lowering the melt viscosity of the polyamide and also of preventing the peak rise in melt viscosity of anionically polymerized polyamides noted upon subsequent melting and heating required for various processing techniques.

Amide-splitting agents such as benzamide and benzoic acid are disclosed in British Patent 907,015, issued Sept. 26, 1962.

The above-described process utilizing a combination of high polymerization temperatures, short residence times and dicaprolactim ether cocatalyst permits the continuous extrusion of high molecular weight polyamides having good color and excellent physical and mechanical properties. With the proper choice of the exit die, continuous shapes such as filaments, strips, strands, ribbon, film, sheets, tubes or hoses can be obtained. The products can be used directly or can be converted into chips, pellets or powders, which, after removal of water soluble materials, can be further processed with plastic or fiber-forming equipment into finished shaped products.

The invention can be further illustrated by the examples given below, but it is to be understood that the invention is not to be limited to the details disclosed therein.

Reduced viscosities were determined on polymers from which water soluble materials have been removed as 0.5% solutions in concentrated sulfuric acid at 25° C.

The percent extractables was determined by grinding the dried polymer pellets in a Wiley mill to pass through a 20 mesh screen (U.S. Standard Sieve Series) and treating the ground product with boiling water for one hour. A suitable aliquot of the resultant solution was prepared and the ultraviolet absorption of the solution measured and compared with a previously determined calibration curve.

In the examples all parts are by weight unless otherwise noted.

Example 1

Molten caprolactam, containing less than 50 p.p.m. of water, sodium metal and dicaprolactim ether in a molar ratio of 600:1:1 were admixed in a steam jacketed vessel and fed to an extruder at a rate of 42.3 grams per minute. The extruder had a volume of 144 cc. The barrel of the extruder was fitted with 4 controllable band heaters. Additional heaters were installed on the exit port which was fitted with a die producing a monofilament. The temperature range of polymerization was from 278° C. to 300° C., and the residence time, that is, the time required for the polymerizing mixture to be advanced through the extruder, was 3.4 minutes. The polymer monofilament was cooled by passing through a cold water bath and collected on a reel.

The product had a reduced viscosity of 8.5 after extracting 15.9% of water extractable material. The weight average molecular weight as determined by light scattering technique was 257,000. The reduced viscosity corresponds to a Fikentscher K value of 82, a measure of molecular weight calculated as described in Modern Plastics, vol. 23, No. 3, pages 157 to 161, 212 et. seq.

Examples 2–9

The procedure as in Example 1 was followed varying the molar ratio of the reactants and the residence time as set forth in the table below, where CL represents caprolactam, Na represents sodium catalyst and DCE represents dicaprolactim ether.

| Ex. | Molar ratios | | | Temp. range (° C.) | Residence time (Min.) | Reduced viscosity | Conversion (percent) | K value | Molecular weight |
| --- | --- | --- | --- | --- | --- | --- | --- | --- | --- |
| | CL | Na | DCE | | | | | | |
| 2 | 600 | 1 | 1 | 307–282 | 4.4 | 6.7 | 82.7 | 74 | 208,000 |
| 3 | 600 | 1 | 1 | 305–285 | 4.2 | 7.08 | 83.9 | 76 | 220,000 |
| 4 | 600 | 1 | 1 | 308–282 | 4.0 | 5.84 | 85.3 | 69 | 185,000 |
| 5 | 600 | 1 | 1 | 308–275 | 3.8 | 6.4 | 83.6 | 74 | 204,000 |
| 6 | 300 | 1 | 1 | 300–270 | 2.7 | 2.45 | 88.0 | 50 | 73,000 |
| 7 | 300 | 1 | 1 | 308–275 | 3.8 | 6.33 | 86.7 | 73 | 195,000 |
| 8 | 200 | 1 | 1 | 304–275 | 3.3 | 5.39 | 87.5 | 67 | 165,000 |
| 9 | 200 | 1 | 1 | 305–275 | 4.3 | 1.9 | 87.5 | 49 | 53,300 |

It is apparent that by proper choice of catalyst and cocatalyst concentration and reaction time, polyamides having a wide range of molecular weights can be obtained.

Example 10

Mixtures containing caprolactam, sodium metal and dicaprolactim ether were charged to the measuring head of a Brabender Plasticorder, which measures the torque necessary to provide mixing in the head. The apparatus was enclosed in a controlled atmosphere chamber having ports for the reaction mixture to be introduced and for a dry nitrogen gas sweep. A recorder attached to the measuring head noted the variations of torque and temperature with time. Various experiments were carried out and the results are given in the table below wherein the initial temperature is that of the head when the lactam mixture was added; the induction time is the time noted from the addition of reactants to the first rise in the torque (measured in metergrams) required for mixing; the maximum torque; the temperature of the mixture at the maximum torque is noted; and the temperature and torque observed upon continued heating of the polymer for 30 minutes after addition of reactants.

| Molar ratio | | | Induction | | Maximum viscosity | | | 30 minutes | | |
| --- | --- | --- | --- | --- | --- | --- | --- | --- | --- | --- |
| Caprolactam | Potassium | DCE | Initial temp.,° C. | Time (min.) | Temp. (° C.) | Time (min.) | Torque (mgr.) | Temp. (° C.) | Torque (mgr.) | Percent change in torque |
| 200 | 1 | 0 | 235 | 1.5 | 255 | 1.7 | 6,250 | 247 | 700 | 89 |
| 200 | 1 | 1 | 235 | 0.2 | 250 | 0.8 | 1,900 | 245 | 500 | 73 |
| 400 | 1 | 1 | 238 | 0.5 | 252 | 1.3 | 4,200 | 254 | 1,375 | 67 |
| 400 | 1 | 2 | 240 | 0.2 | 252 | 1.6 | 1,750 | 254 | 1,300 | 26 |

It is apparent that the presence of the dicaprolactim ether cocatalyst shortens the induction time required for the formation of high molecular weight polymer, lowers the maximum melt viscosity reached, and in the case where more cocatalyst than catalyst was present, stabilized the polyamide to the degradative viscosity effects which normally occur on continued heating of the polyamide.

Example 11

The storage stability of various cocatalyst/catalyzed monomer solutions were compared maintaining the solutions at a temperature of 100° C. The stability was taken as the time when a visual indication of polymerization was noted, i.e., the formation of a precipitate, cloudy solution, increase in viscosity, etc. The results are shown in the table below:

| Molar ratio, Caprolactam: Sodium:Cocatalyst | Cocatalyst | Stability (hours) |
| --- | --- | --- |
| 600:1:1 | Dicaprolactim ether | >72 |
| 600:1:1 | N-acetyl caprolactam | 0.1 |
| 200:1:1 | Tolylene diisocyanate | 2 |
| 100:1:1 | do | 0.5 |
| 600:1:1 | Triphenoxy triazine | 3 |
| 600:1:1 | Isophthaloyl-bis(3,5-dimethyl)pyrazole | 0.5 |

Examples 12–15

The procedure of Example 1 was followed using a mixture containing from about 5 to about 30 mol percent of lauryllactam in caprolactam, the monomer to catalyst to cocatalyst mol ratio being 2001:1. The mixtures were polymerized at 275° C. and the residence time maintained at 6 to 7 minutes. Results are given in the table below:

| Mol percent lauryl-lactam | Reduced viscosity | Percent extractables |
| --- | --- | --- |
| 4.75 | 2.1 | 11.0 |
| 9.0 | 2.2 | 10.0 |
| 20 | 2.4 | 7.3 |
| 30 | 2.7 | 12.2 |

It will be apparent that many modifications and variations can be made without departing from the scope of the novel concepts of the present invention and the illustrative details disclosed herein are not to be construed as imposing undue limitations on the invention.

I claim:

1. A process for the continuous polymerization of lactams of 5 to 12 carbon atoms in the lactam ring which comprises:
    (a) feeding a substantially anhydrous mixture containing 1 or more of said lactams, an anionic catalyst and dicaprolactim ether cocatalyst into the inlet port of an extruder,
    (b) polymerizing said mixture at a temperature between about 260° C. and about 325° C. while continuously conveying the polymerized mixture to the outlet port of the extruder, and
    (c) removing the polymerized mixture through a die as a continuous shaped profile, said mixture containing from about 100 to 1200 mols of lactam for each mol of catalyst and the molar ratio of catalyst to cocatalyst being at least 1:0.5, and the total residence time of the polymerizing mixture in the extruder being between about 3 and about 12 minutes.

2. A process according to claim 1 wherein said anionic catalyst is selected from the group consisting of lithium, potassium, sodium and their hydroxides, oxides, hydrides, alkoxides, amides, borohydrides, alkyl and aryl derivatives.

3. A process according to claim 2 wherein said temperature is between about 280° C. and about 310° C. and said residence time is between about 4 minutes and about 6 minutes.

4. A process according to claim 3 wherein said lactam is caprolactam.

5. A process according to claim 3 wherein said lactam comprises from about 1 to about 99 mol percent of caprolactam and from 99 to 1 mol percent of lauryllactam.

6. A process according to claim 4 wherein said temperature is between about 275° C. and about 300° C.

7. A process for the continuous polymerization of lactams of 5 to 12 carbon atoms in the lactam ring which comprises:
    (a) feeding a substantially anhydrous mixture containing 1 or more of said lactams, an anionic catalyst and dicaprolactim ether cocatalyst into the inlet port of an extruder,
    (b) polymerizing said mixture at a temperature between about 260° C. and about 325° C. while continuously conveying the polymerized mixture to the outlet port of the extruder,
    (c) passing the molten polymerized mixture through a chamber having a constant dry nitrogen gas sweep to remove monomer and oligomers, and
    (d) removing the polymerized mixture through a die as a continuous shaped profile, said mixture containing from about 100 to about 1200 mols of lactam for each mol of catalyst and the molar ratio of catalyst to cocatalyst being at least 1:0.5, and the total residence time of the polymerizing mixture in the extruder being between about 3 and about 12 minutes.

8. A process for the continuous polymerization of lactams of 5 to 12 carbon atoms in the lactam ring which comprises:
    (a) feeding a substantially anhydrous mixture containing 1 or more of said lactams, an anionic catalyst and dicaprolactim ether cocatalyst into the inlet port of an extruder,
    (b) polymerizing said mixture at a temperature between about 260° C. and about 325° C. while continuously conveying the polymerized mixture to the outlet port of the extruder,
    (c) passing the molten polymerized mixture into a vacuum chamber, to remove monomer and oligomers, and
    (d) removing the polymerized mixture through a die as a continuous shaped profile, said mixture containing from about 100 to about 1200 mols of lactam for each mol of catalyst and the molar ratio of catalyst to cocatalyst being at least 1:0.5 and the total residence time of the polymerizing mixture in the extruder being between about 3 and about 12 minutes.

References Cited

UNITED STATES PATENTS

| | | | |
| --- | --- | --- | --- |
| 3,141,006 | 7/1964 | Kohan | 260—78 |
| 3,200,095 | 8/1965 | Wichterle et al. | 260—78 |
| 3,216,976 | 11/1965 | Schwartz et al. | 260—78 |
| 3,309,343 | 3/1967 | Darnell et al. | 260—78 |
| 3,321,447 | 5/1967 | Kunde et al. | 260—78 |
| 3,317,482 | 5/1967 | Kunde et al. | 260—78 |

HAROLD D. ANDERSON, Primary Examiner

U.S. Cl. X.R.

260—78